March 11, 1958     A. F. SPERRY     2,826,068

AVERAGE FLOW INDICATING AND RECORDING SYSTEM

Filed June 15, 1954     3 Sheets-Sheet 1

INVENTOR.
Albert F. Sperry
BY
Russell E. Hattis

March 11, 1958     A. F. SPERRY     2,826,068
AVERAGE FLOW INDICATING AND RECORDING SYSTEM
Filed June 15, 1954     3 Sheets-Sheet 2

INVENTOR.
Albert F. Sperry
BY
Russell E. Hatle

March 11, 1958 A. F. SPERRY 2,826,068
AVERAGE FLOW INDICATING AND RECORDING SYSTEM
Filed June 15, 1954 3 Sheets-Sheet 3
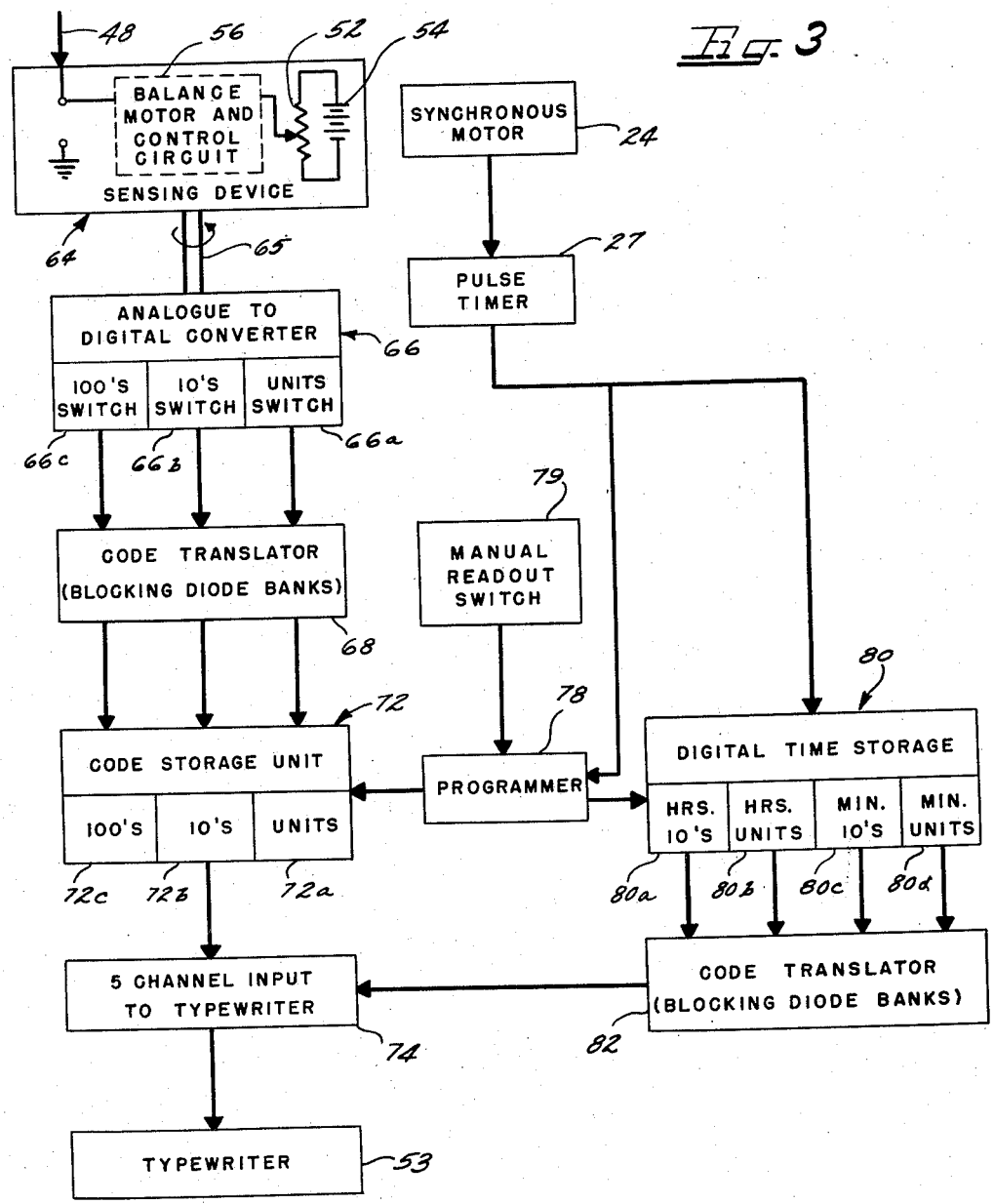
INVENTOR.
Albert F. Sperry
BY
Russell E. Hattis

United States Patent Office 2,826,068
Patented Mar. 11, 1958

2,826,068

AVERAGE FLOW INDICATING AND RECORDING SYSTEM

Albert F. Sperry, Chicago, Ill., assignor to Panellit, Inc., Chicago, Ill., a corporation of Illinois Application June 15, 1954, Serial No. 436,971

13 Claims. (Cl. 73—194)

The present invention relates to the measurement of process variables and more particularly to the measurement of the flow of fluid in one or more parts of a given system, although certain aspects of the invention have a more general application.

In many industries, the ultimate objective is the production of a given quantity of material over a given reference period to meet the demands of their customers. To operate at or near peak efficiency, it is apparent that a constant check on the various stages of the process must be made to ferret out any abnormal operating conditions so that proper corrective action can be immediately taken to insure that the production schedules of the plant can be met. Where the ultimate objective is the manufacture of a given quantity of material per day, for example, it is advantageous to provide continuous information to an operator which quickly indicates whether the system is operating efficiently, and whether the output of the system or any part of the system is sufficient to meet the demands for the day, assuming that the system would continue to operate under the same conditions for the rest of the day.

An indication of the instantaneous rate of flow of a fluid through a conduit is obviously unsatisfactory for these purposes. As a practical matter, the instantaneous rate of flow of fluid in many processes normally fluctuates over appreciable limits so that information on instantaneous rates of flow are of little value. More important, perhaps, is information on the integration of these rates of flow which gives data on volume or accumulated quantity of flow. Information, for example, on how many gallons of fluid has flowed through a given conduit over a given period of time is extremely helpful, but it is difficult for most operators to use this information to determine at an instant whether the system is operating at the desired efficiency and to determine quickly the existence of abnormal conditions which may develop suddenly in the system.

Accordingly, an object of the invention is to provide flow indicating apparatus which gives the operator usable information by which he can quickly determine the condition of a flow variable whose instantaneous rate of flow may fluctuate over wide limits; another object of the invention is to provide flow indicating apparatus which provides continuous information on the average rate of flow of fluid over variable and relatively small intervals of time relative to a twenty-four hour period, for example, so that abnormal conditions in the system may be quickly recognized.

A further object of the invention is to provide an indication of the average rate of flow of a fluid in one or more parts of a system, and for automatically and periodically checking the flow at one or more points to record information on average flow rates cyclically as over hourly or other predetermined time intervals. An ancillary object of this invention is to provide a means for indicating and recording on demand the quantity of flow of fluid in one or more points of a system, which information is always referred to a common reference time interval as, for example, a twenty-four hour period.

A still further object of this invention is to provide means for automatically monitoring the flow of fluid at one or more points in a system periodically, and for also providing information on average flow at these points at any time during successive predetermined time intervals.

In a preferred embodiment of the invention herein illustrated, a measurement of the average rate of flow is provided in the form of an electrical quantity, such as voltage, current, phase angle, etc., and a common sensing and translating unit is sequentially coupled to the outputs of the respective measuring means to feed, sequentially, information on average flow at each of the points to a recording instrument, such as an automatic typewriter. The measuring means provide information of average flow over gradually increasing time intervals beginning each hour. Average flow data of the check points is printed automatically at the end of each hourly period and the data is based on a twenty-four hour period. The operator by pressing a manual read-out switch can obtain printed data of average flow during the hourly periods involved.

Where the flows in different parts of a system are appreciably different, flow measuring means having different scale factors are used. Provision for modifying the outputs of the various flow measuring means is necessary so that a common recording instrument can print information of average flow corrected for the different scale factors.

Accordingly, another object of the invention is to provide a means for monitoring the flow condition of a number of points in an industrial process, and for sequentially feeding information on the flow at these points to a central recording device in the form of electrical signals, and to provide scale compensating means so that the information recorded by the electrical recording device will indicate directly the measured quantities, with the scale factors already taken care of.

An exemplary system by means of which the above and other objects of the invention are attained will be described in the specification to follow taken in conjunction with the drawings wherein:

Fig. 3 is a detailed block diagram of a recording system which may be used in conjunction with the flow measuring apparatus illustrated in detail in Fig. 2.

Refer now to the drawings where the same reference numerals indicate similar elements throughout.

Figure 1:
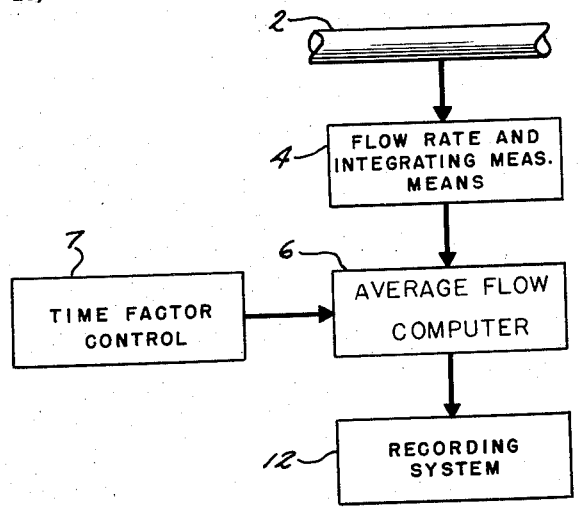
Fig. 1 is a simplified block diagram of a flow measuring and indicating and recording system incorporating features of the present invention.

In Fig. 1 a simplified box diagram is shown of some of the major components making up an exemplary flow indicating and recording system incorporating features of the invention. Reference numeral 2 represents a fluid carrying conduit the flow conditions of which are to be indicated and recorded by the system to be described. A suitable integration flow meter 4 is connected to the conduit 2 to provide an indication of the quantity of fluid which flows through the conduit 2 for a given period of time. The output of the flow meter 4 is in the form of a mechanical or electrical quantity which is a measure of the volume of fluid which has passed through the conduit 2 over a period of time. This output is fed to an average flow computer 6, the details of which will be described hereinafter. This computer serves the purpose of providing an electrical or mechanical output which is a measure of the flow in the conduit 2 referred to a common reference interval of time so as to indicate a quantity proportional to the average rate of flow in the conduit. More specifically, the computer 6 takes the information on the total amount of flow occurring in the conduit 2 over any variable period of time and multiplies this information by a factor which is a function of the above-mentioned interval of time to provide an indication which is proportional to the average flow or rate of flow occurring during this time interval. Information thus presented by the computer 6 is of great importance to the operator since he is immediately apprised of the average flow condition of the process thus involved and he is able to compare the average flow reading with a predetermined criteria to determine whether the system is operating properly.

In a preferred form of the invention, the computer 6 provides a continuous source of information on the average rate of flow through the conduit 2 for any interval of time within an hourly period beginning with each hourly period. Since one of the ultimate objectives is to inform the operator whether a given production schedule can be met, the preferred form of the invention provides a recorded indication of average flow with reference to a twenty-four hour period or any other interval on which a production schedule may be based. Thus, average flow information is printed as so many barrels, gallons, etc., per day.

To illustrate more specifically what information is provided by the computer 6, if F represents the total quantity of fluid flowing through the conduit 2 within a given time interval, and $t$ represents the time interval, computer 6 provides a measure of the quantity $F/t$ which is the average rate of flow for that interval. This average value, of course, can be referred to any predetermined period of time, such as a day, by simple multiplication by a constant factor. If $t$ is in minutes, then multiplying by 1440 ($60 \times 24$) will convert the average rate reading to a twenty-four hour period basis.

A time control, indicated by the box 7, feeds continuous information on the quantity $t$ to the computer 6. Thus, if the flow measuring means 4 indicates that ten barrels of oil, for example, has flowed through the conduit 2 in fifteen minutes, then the computer will indicate a quantity proportional to 10/15 or .67 barrel per minute. On the basis of a twenty-four hour period, this represents an average rate of flow of 964.8 barrels per day. The operator can compare this value with the daily production schedule for the corresponding part of the system and determine immediately if the system has been functioning properly during the aforementioned period of time and whether the daily production schedule will be met if the system continues to operate as it has for the previous fifteen minute period.

The computer 6 continuously feeds information to a recording system 12 which automatically records the values of the flow condition in the conduit 2.

Figure 2:
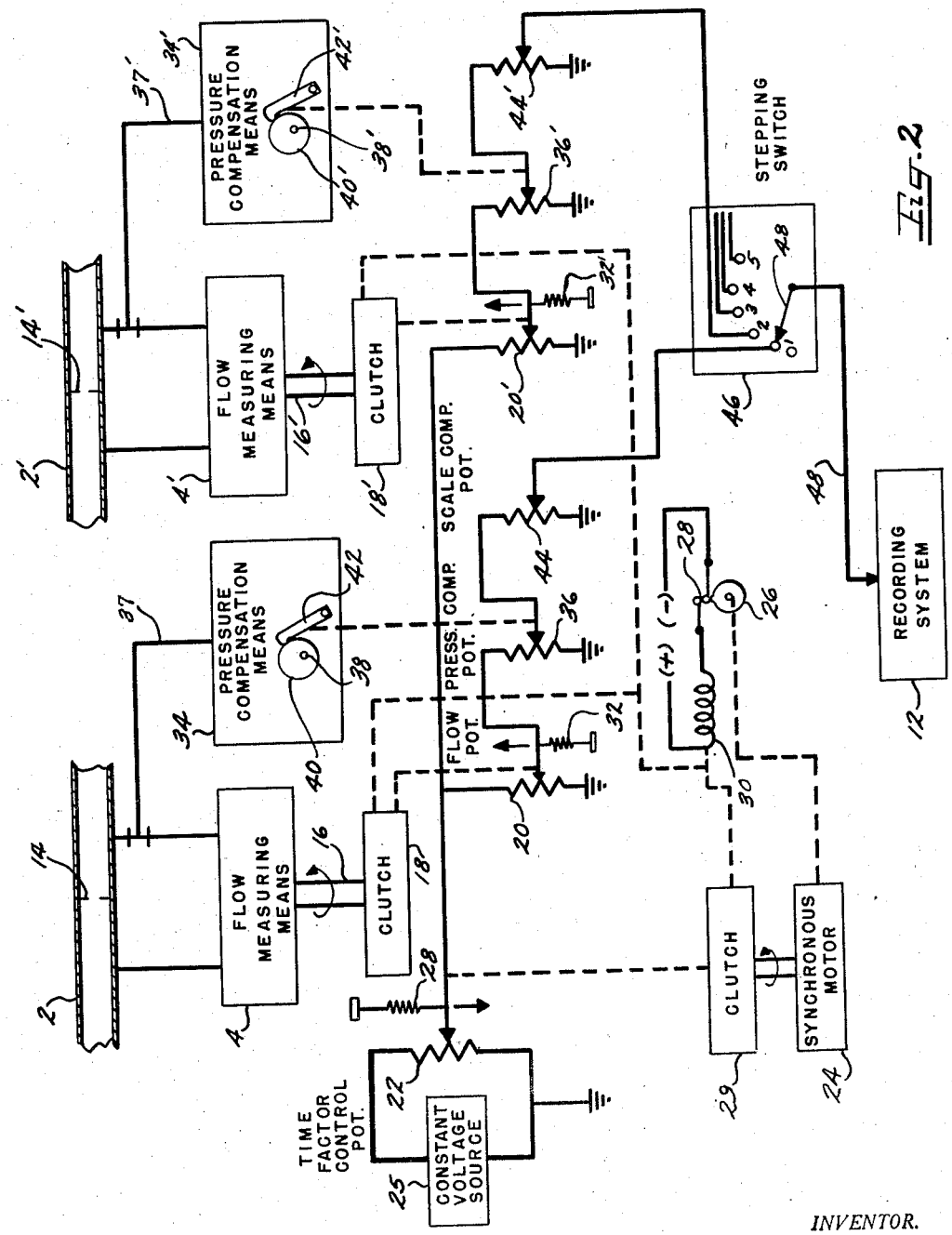
Fig. 2 is a detailed block diagram of a flow measuring and indicating system utilizing the present invention.

A more complete exemplary system utilizing the teachings of the present invention will now be described and reference should now be made to the schematic diagram of Fig. 2. In this embodiment, the invention has been applied to an automatic process logging system which sequentially scans a number of test points in an industrial process periodically, preferably hourly, and automatically records the values of the process variables scanned using an automatic typewriter which types directly the measurements of the scanned variables. The present invention deals primarily with flow process variables, and to illustrate the invention two conduits 2 and 2′ have been shown, the flow values of which are to be sequentially and hourly recorded preferably on a logging sheet carried by an automatic typewriter which is part of the recording system 12. The type numbers are to represent the average flow for each hourly period based preferably on a twenty-four hour period as above explained. Means are also provided for recording, on demand, the average flow values at any time between the regular hourly recording periods. (It should be understood that in an actual logging system, a great number of variables are logged, and only two such variables are shown in Fig. 2 for purposes of simplicity.)

Since the components associated with the fluid conduits 2 and 2′ are identical, only the components associated with the fluid conduit 2 will be described; those components which are connected to fluid conduit 2′ have been given the same reference numerals as the corresponding components associated with the conduit 2 except that a prime has been added to the numbers.

The flow measuring means 4 is shown schematically as being of the type which operates on a differential pressure drop produced in the fluid conduit 2 by means of a pressure-dropping orifice 14. The flow measuring means in such case would incorporate means for measuring the rate of flow of fluid in the conduit 2, which rate of flow is proportional to the square root of the difference in pressure on opposite sides of the orifice. Any suitable means may be provided for providing an electrical or mechanical output proportional to the square root of the pressure differential. For example, in one form of measuring means the pressures at the opposite sides of the orifices 14 are fed to a bellows mechanism which provides a mechanical movement proportional to the difference of pressure on the opposite sides of the bellows. A suitable cam is associated with the bellows output to provide a square root corrective function. Other suitable mechanical means are provided for integrating the rate of flow quantity to produce an electrical or mechanical output which is a measure of the quantity of integrated rate of flow of fluid through the conduit 2. One suitable flow measuring means is disclosed in U. S. Letters Patent No. 2,637,496, granted May 5, 1953 to Albert F. Sperry.

In the description to follow it will be assumed that the output of the flow measuring means 4 will be a mechanical output in the form of the movement of a shaft 16 the angular position of which is a measure of the integrated rate of flow or the quantity of fluid which has passed through the associated conduit 2 over a given interval of time.

The shaft 16 is coupled to any suitable clutch 18 which in turn is mechanically coupled to the movable contact of a linearly wound potentiometer 20, which will be referred to as a flow potentiometer. The position of the contact of this potentiometer varies with the quantity of fluid flowing through the conduits 2 from a given reference time. The input of the potentiometer 20 is coupled through a potentiometer 22 to a source of constant voltage 25, for reasons which will be hereinafter explained.

As above explained, one of the objects of the invention is to provide an indication proportional to the average rate of flow of fluid in one or more parts of a system. The flow potentiometer 20 and the associated circuits form an electrical computer circuit for obtaining this information. It should be understood, however, that a wide variety of mechanical and electrical computers may be utilized to obtain this information. In the illustrated embodiment, the voltage output of the flow potentiometer 20 between the movable contact thereof and ground, is made proportional to the average rate of flow or fluid occurring over any interval of time within a fixed predetermined period, which is preferably an hourly period.

Means is provided for returning the movable contact of the flow potentiometer 20 to a zero or reference output position at the end of each hourly period, so that the output of the potentiometer 20 indicates or is proportional to the average rate of flow of fluid during each hourly period. This means includes a synchronous motor 24 which drives a cam 26 through one complete revolution each hour. The cam includes a projection which closes a pair of contacts 28 for a small instant of time so as to energize an electromagnet 30 whose armature controls the clutch 18. When the electromagnet 30 is energized, its armature operates the clutch 18 to disconnect the shaft 16 from the movable contact of the potentiometer 20, whereupon the movable contact returns to a zero position under the control of a suitable return spring 32. The amount of time necessary to reset or return the potentiometer to zero is sufficiently small that little error is introduced into the system. Accordingly, the cam 26 closes the contacts 28 for a sufficient time only to enable the flow potentiometer to be reset to zero position.

The position of the movable contact of the potentiometer 20 with reference to the start position is proportional to the quantity of fluid which has flowed through the conduit 2 from the beginning of an hourly period to any time within such period. In order to provide a voltage output which is proportional to the average rate of flow over any period within such hourly period, it is necessary to introduce a time factor in the output of the potentiometer 20. This may consist of a suitable time responsive means which either operates directly on the output of the potentiometer 20, or one which controls the input voltage to the potentiometer in a manner such that its output will be proportional to the average rate of flow of fluid in the conduit 2. In the example illustrated in Fig. 2, the input voltage to the potentiometer 20 is controlled to effect this result. Accordingly, the output of the constant voltage source 25, which we will take to be a D. C. potential, is fed across the potentiometer 22, which will be referred to as a time factor control potentiometer.

The movable contact of this potentiometer 22 is moved in a manner such that the output of the potentiometer, which is between the movable contact and a ground or reference position, is inversely proportional to time. The movable contact of this potentiometer, therefore, is at the high voltage side of the potentiometer at the beginning of any hourly period and during that period is moved in a direction toward the ground terminal of the potentiometer. The potentiometer 22 may be a non-linearly wound potentiometer so that the movement of its movable contact may be at a linear rate to effect an output voltage inversely proportional to time or the potentiometer could be linearly wound and a non-linear movement imparted to the latter contact. In the illustrated example, the potentiometer 22 is a non-linearly wound potentiometer and its movable contact is moved at a linear rate. To this end, the latter contact is moved by means of the synchronous motor 24, the shaft movement of which is coupled to the movable contact of the time factor potentiometer 22 by means of a suitable clutch mechanism 29.

At the beginning of each hourly period, the clutch 29 disengages the synchronous motor shaft movement from the movable contact of the potentiometer so as to enable a return spring 28 to return the movable contact to its zero or reference position near the positive end thereof. This, of course, occurs simultaneously with the return of the movable contacts of the flow potentiometers 20. The clutch 29 may be accordingly operated by the same relay 30 which operates the clutch 18 associated with the flow potentiometer 20. The potentiometers 20 and 22 are suitably arranged such that if the rate of flow of fluid in the conduit 2 remains constant, the output voltage of the flow potentiometer 20 will likewise remain constant. Likewise, these potentiometers are arranged so that increase in the average rate of flow of the fluid in the conduit 2 will result in an increase in output voltage at the potentiometer 20, and a decrease in the average rate of flow will result in a corresponding decrease in the output voltage of the potentiometer 20.

Since the output of the flow potentiometer 20 associated with the conduit 2' is coupled to the output of the time factor control potentiometer 22, its output will likewise vary in accordance with the change in the average rate of flow of the fluid in the conduit 2'. The armature of the electromagnet 30 is accordingly connected with the clutch 18' associated with the conduit 2' to return the latter flow potentiometer 20' to a zero position simultaneously with the resetting or returning of the movable contact of the other flow potentiometer 20 to zero reference position.

Most existing commercial flow meters provide accurate readings for a particular static pressure in the conduit with which it is used. When any appreciable variations of static pressure occur, appreciable errors may be introduced into the flow meter indications. The present invention provides a means for automatically compensating for the errors in the flow meter introduced by the variation in static pressure. The mathematical equation representing this error of course varies with the particular flow meter utilized and a suitable pressure responsive means, indicated generally by the reference numeral 34, is provided which imparts movement to the movable contact of a pressure compensation potentiometer 36 whose input is connected to the output of the flow potentiometer 20. The potentiometer 36 in effect is a multiplying device for including a compensation error factor in the output voltage of the flow potentiometer 20 to provide a compensated average flow indicating voltage.

Where the static pressure varies only an insignificant amount, the pressure compensating feature of the invention could, of course, be omitted.

The pressure compensating means 34 may include an input line 37 which is connected to the upstream side of the orifice 14 and means for converting the input pressure variations to a mechanical shaft movement such as the shaft 38 associated with a cam 40. The cam 40 may be suitably shaped to correspond with the pressure compensation equation, and the cam in turn controls the movement of a pivoted follower arm 42 which in turn is coupled to the movable contact of the pressure compensation potentiometer 36, to introduce the proper connection factor into the output of flow potentiometer 20.

In a manner which will be briefly outlined hereinafter, signals or voltages representing the flow measurements in the conduits 2 and 2' are sequentially fed to a recording system which automatically records or logs the measured quantity. Obviously, since flow rates may vary widely in different parts of a chemical or other industrial process, the various flow potentiometers 20 will have different full scale values so that some means must be provided to vary the aforementioned signal or control voltage with the particular scale factors involved. Assume, for example, that the movable contact of the flow potentiometer 20 associated with the conduit 2 is moved over its extreme limits by a flow of X barrels of fluid through the conduit 2 in an hour. The full scale movement of the flow potentiometer 20' associated with the conduit 2' may, on the other hand, represent the flow of Y barrels of fluid which may be one-half of the value of X barrels of fluid. Since both flow potentiometers 20 are coupled in parallel at their inputs, the maximum voltage outputs of both potentiometers may be the same even though they represent different magnitudes of flow. Some means should therefore be provided to introduce a scale corrective factor. The introduction of a scale compensation factor could, of course, be introduced at any point in the system. In the example illustrated in Fig. 2, scale compensation is provided at the output of the pressure compensation potentiometer 36.

A scale compensation potentiometer 44 is accordingly provided whose input is coupled to the output of the pressure compensation potentiometer 36; the potentiometer 44 has various tap points for the different scales which may be used with the flow measuring devices contemplated for a particular system. Assuming a linear scale compensating potentiometer, the potentiometer associated with a flow potentiometer whose full scale movement is to represent say X gallons, the movable contact of the compensating potentiometer would be placed at the appropriate tap-off point which would produce twice the output voltage for a given input voltage as the scale compensating potentiometer associated with the circuit wherein the full scale value would be $X/2$.

The outputs of the scale compensating potentiometers 44 are connected to different contacts of a suitable switching device such as a telephone-type stepping switch, indicated generally by the reference numeral 46. At the appropriate time when the recording of the measured quantities is desired, the movable contact 48 of the stepping switch is connected sequentially to the contacts which connect with the outputs of the scale compensating potentiometers of the various branches of the system. Voltages corresponding to the flow measurements of these various branches is thus sequentially fed via a line 48 to a suitable recording system previously referred to by the reference numeral 12. Recording apparatus for converting measurements in the form of electrical quantities to printed or other record form are well known; any suitable recording system may be used. For example, a recording system based on those disclosed in U. S. Patent 2,207,743 to Larson, and U. S. Patent 2,313,752 to LeClair could be used.

The stepping switch 46 (Fig. 2) coupled to the output of the scale compensating potentiometers may be continuously operated so that information on the values of flow is continuously sequentially fed to the input of the recording system. The stepping switch scans or samples all the outputs of the scale compensating potentiometers a number of times between and at the end of each hourly period.

In the embodiment previously described, the magnitude of the signal voltages fed to the recording system is a measure of the average rate of flow of fluid in the conduits 2 and 2'. As previously stated, this average flow may be referred to a twenty-four hour period. The input voltage to the recording system is a measure of average flow on whatever basis it is taken and the recording of the flow values may be referred to any time basis automatically.

Refer now to Fig. 3 showing a preferred form of recording system. The recording system there shown provides a typewritten record of the flow and other variables of a system and utilizes a conventional automatic typewriter 53 which may be a teletypewriter or similar device which operates on a five channel code, although any other suitable codes may be utilized.

The recording system preferably automatically records printed information on the flow and other variables of the system just prior to the end of an hourly period so that regular cyclic records of the flow and other conditions of the system are automatically obtained. Further, manual read-out means are provided which, on demand of an operator, will actuate the typewriter to type information on the various variables of the system at any particular time in an hourly interval. Information on the time at which the data was taken is also typed automatically opposite the data on the process variables.

The signals from stepping switch 46 are sequentially fed to a sensing device 64 which may be a null-balancing potentiometer. A null-balancing potentiometer provides a mechanical output in the form of a shaft movement, the angular position of which is a measure of the magnitude of the signal voltage fed to the sensing device at any particular time. The null-balancing potentiometer usually includes a slide wire potentiometer 52, a source of reference voltage 54 coupled across the slide wire potentiometer, and a balance motor and control circuit 56 which compares the input voltage to the sensing device with the voltage at the movable contact of the slide wire potentiometer and automatically drives the movable contact of the slide wire potentiometer to a balancing position. The movement of the motor is coupled to a shaft 65 through suitable bearings, such that the angular position of the shaft indicates the magnitude of the voltage fed to the sensing device.

The output shaft motion of the sensing device 64 is fed to an analogue to digital converter 66 which converts the single shaft output of the sensing device to three separate shaft rotations representing, respectively, the three digits of a number representing the angular position of the shaft 65 which in turn represents the value of the process variable switched into the sensing device at that particular time. This is a well known type of digital converter of the electro-mechanical type. If desired, an electronic digital converter or other digital converter could be substituted for the electro-mechanical digital converter 66.

Electro-mechanical digital converters usually include three ten position switches represented by the reference numerals 66a, 66b and 66c, the wiper contacts of which connect with the contacts numbered 0–9 which represent the digits of a three digit number. The switches are positioned by three intermeshed gears or ratchet wheels having a ten to one step down ratio. If a transducer indicates, for example, that a process variable had a value of one hundred thirty-four, the wiper contact of the ten position units switch 66a is positioned to the number four contact, the wiper contact of the ten switch 66b would be on the number three contact, and the wiper arm of the hundred switch 66c would be on the number one contact. Suitable transfer voltages are applied to the wiper contacts of these switches in a manner to be described.

The different switch contacts of the digital converter switches are respectively coupled to hundreds, tens and units section of a suitable code translator 68. Additional sections would be used, of course, with a four digit number. The code translator 68 converts from a decimal indication to a five channel code indication. As is conventional in some types of code translators, each contact of the hundreds, tens and unit switches of the digital converter 66 is coupled through suitable groups of blocking diodes to one or more conductors of a five conductor code line, depending upon the particular five channel code used with the typewriter 53. Each switch of the digital converter is associated with a different five conductor code group representing the respective digits of a three digit number. In one five channel code, for example, the digit zero is indicated by the energization of channels 2, 3 and 5. Accordingly, each of the zero contacts of the hundreds, tens and unit switches of the digital converter are connected through blocking diodes to channels 2, 3 and 5 leading respectively to the hundreds, tens and units register of a code storage unit 72.

The code storage unit is also a well known type of component which comprises banks of self-holding relays in each of the storage registers 72a-c which, when energized, store information on the hundreds, tens and units digits, indicating the digital value of a process variable coupled to the sensing device at a particular moment. Each of the five relays in the hundreds, tens and units registers have respective contacts which lead to the five channel input 74 to the typewriter 53.

The information stored in code storage unit 72 is fed in the form of a voltage applied to one or more of the five input conductors in the typewriter input when a transfer signal is fed sequentially to the hundreds, tens and units registers of the code storage unit 72 from a programmer 78. The programmer 78 is a device for controlling the kind and sequence of information fed to the typewriter. It may, for example, comprise various groups of stepping switches controlled by pulses fed from a pulse timer 27 which includes suitable cams which open and close one or more switches to produce timing pulses. The timer 27 is controlled by the synchronous motor 24 at the appropriate time. At the proper time, the hundreds, tens and units registers of the code storage unit 72 are sequentially energized to transfer signal voltages through the closed storage relay contacts to the five channel input to the typewriter 53.

The programmer 78 is automatically triggered into operation hourly just prior to the resetting of the time factor and flow potentiometers. The programmer 78 may also be rendered active by closing of a manual readout switch 79 during periods occurring between the normal hourly recording periods, for effecting the printing of data effecting the printing of data on all of the process variables scanned between the normal hourly recording periods.

Information on the time of any particular reading is stored in a digital time storage unit 80 which has respective registers 80a–d for tens and units hours measurement and tens and units minutes measurement. These respective registers may comprise suitable interconnected stepping switches connected as a decade counter which are actuated by timing pulses from the timer 24. The various 0–9 digit indicating contacts of the stepping switches of the registers 80a through 80d of the digital time storage unit 80 may be coupled through one or more blocking diodes making up the code translator 82 to the five channel input to the typewriter 53. The information stored in the tens and units registers and the hours and minutes switches 80a to 80d is sequentially transferred to the typewriter input under the control of the programmer, which feeds an energizing transfer voltage sequentially to the wiper contacts of the digital time storage stepping switches which in turn energize the proper channel or channels of the typewriter input by means of the code translator blocking diodes.

In typing the first line of a logging sheet supported by the typewriter 53, the programmer is triggered into operation each hour by pulses from the pulse timer 27, whereupon a transfer voltage is sequentially fed to the hours tens, hours units, minutes tens, and minutes units register of the digital time storage unit 80 to feed, in sequence, the proper signal voltages to the typewriter input which will cause the typewriter to type the time indication at the beginning of the first line. Following this, the programmer sequentially scans the hundreds, tens and units register of the code storage unit 72 to effect feeding of the proper signals to the typewriter input which will type the proper digit indication.

Figure 4:
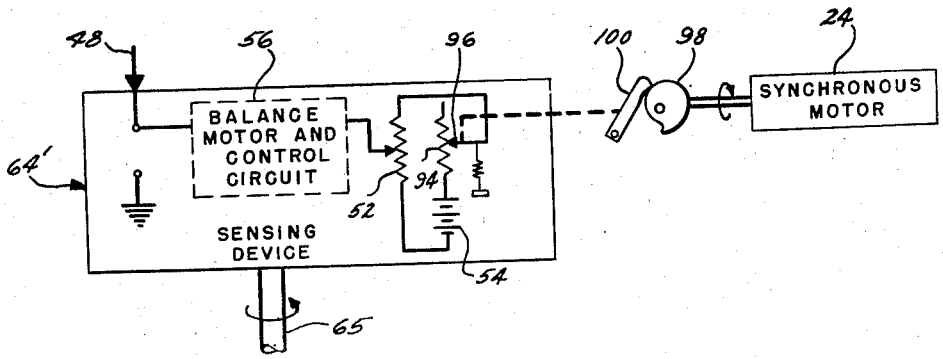
Fig. 4 shows a modification of the system shown in Figs. 2 and 3.

As indicated previously, the time factor may be introduced in the recording system 12 rather than in the potentiometer circuits associated with the respective conduits 2 and 2'. A convenient place to introduce the time factor is in the sensing device 64 and reference should now be made to Fig. 4 showing the modification necessary to effect this result. With this modification, of course, the time factor control potentiometer 22 is omitted from the diagram of Fig. 2 so that the output of the constant voltage source 25 directly feeds the flow potentiometers 20.

The modification made in the sensing device includes the addition of a rheostat 94 in series with the reference voltage source 54 of the null-balancing potentiometer. The movable contact 96 of the rheostat is moved in accordance with a predetermined time function to vary the rheostat resistance which in turn varies reference voltage applied to the slide wire potentiometer 52 so that the output shaft movement of the null-balancing potentiometer is proportional to the average rate of flow in the conduits 2 and 2'. Since the relationship between the voltage input to the null-balancing potentiometer element 52 is not a simple linear or inverse function of the value of the rheostat resistance 94, some means must be provided which varies the rheostat resistance to introduce a time factor in the output of the sensing device which is inversely proportional to time. Although this result could be effected by moving the rheostat contact 96 at a linear rate if the winding of the rheostat were wound in an appropriate non-linear fashion, it is preferred to utilize a suitable control cam 98 for this purpose. The cam 98 actuates a follower arm 100 which in turn is coupled to the movable arm 96 of the rheostat. By suitably shaping the cam 98 the desired result can be effected including returning the rheostat movable contact to a reference start position hourly. The cam 98 is rotated by synchronous motor 24 and makes one revolution per hour.

The present invention thus provides for the automatic measuring and recording of flow data wherein the recorded information is proportional to the average rate of flow of fluid through the associated conduits over hourly or fractional hourly periods. The value recorded is actually based on a twenty-four hour period so that the operator is apprised at all times of the operation of the system in relationship with the overall daily requirements of a particular process.

It should be understood that numerous modifications may be made of the preferred embodiment of the invention above described without deviating from the broader aspects of the invention. The expression "same base unit of time" used in the claims in connection with the output representing average rate of flow refers to average rate of flow data covering different time intervals but based on the same or common time unit such as per hour or per day. For example, if the time intervals are for zero to five minutes, zero to ten minutes, zero to fifteen minutes, etc., the average rate of flow output would be in terms of the same base unit of time for the different respective intervals if it was X gallons per day, y gallons per day, and z gallons per day, etc., for the aforementioned intervals.

I claim:

1. In apparatus for monitoring the flow of fluid in a conduit: a flow measuring device, a source of reference potential, a flow potentiometer having its input coupled across said potential source, means responsive to said flow measuring device for moving the movable contact of said potentiometer at a rate proportional to the instantaneous rate of flow of fluid in said conduit, time factor control means coupled to said potentiometer for providing a resultant flow rate output which is inversely proportional to the varying time interval over which the integrated flow measurement is taken, and pressure compensating means responsive to the static pressure in said conduit and coupled to said potentiometer for automatically adjusting the output thereof to provide a compensated voltage output which corrects for errors introduced into said flow measuring device by the variations of static pressure in said conduit.

2. Apparatus for monitoring the flow of material at a number of points in a system comprising respective flow measuring devices, a source of reference potential, flow potentiometers having their inputs coupled across said potential source, the respective limits of movement of said respective potentiometers representing different ranges of flow measurement, said flow measuring devices including means for moving the movable contacts of said respective potentiometers at a rate proportional to the instantaneous rate of flow of material at said points, respective scale compensating means coupled to said potentiometers for providing respective compensated voltage outputs which are an accurate measure of the measured flow characteristics, a common indicating means responsive to the resultant compensated voltage outputs of said potentiometers for indicating the values of the variables indicated by the corrected voltage outputs of said potentiometers and switch means for sequentially connecting said common indicating means to said compensated voltage outputs.

3. In flow responsive apparatus: means for providing a measure of the quantity of material which has flowed through a given system up to any one of a number of instants during a given period of time, time factor control means for providing a measure of the time which has elapsed since the beginning of said period and any corresponding one of said instants of time within said period, and means responsive both to said first and second mentioned means for automatically providing a continuous output which is a function of the average rate of flow in terms of the same base unit of time, between the beginning of said period and any of said instants of time therein.

4. In apparatus for monitoring the flow of material in a flow system: a flow measuring device for measuring the total quantity of material flow, a source of reference potential, a flow potentiometer having its input coupled across said potential source, means responsive to said flow measuring device for moving the movable contact of said potentiometer at a rate proportional to the instantaneous rate of material flow, means for automatically periodically resetting said movable potentiometer contact to a zero or reference position wherein the output of said potentiometer is a function of the total flow of material for successive periods of time, time factor control means electrically coupled to said potentiometer for providing a resultant output which is proportional to flow measured by said flow measuring device and inversely proportional to the time between the resetting of the movable potentiometer contact to a zero or reference position and any instant prior to the next resetting time, whereby said resultant output provides continuous average flow information covering said respective successive time periods.

5. In flow rate indicating apparatus: first means for providing a measure of the total quantity of material flow at a given point, time controlled means for automatically repeatedly resetting said first means to a zero or reference condition wherein the first means provides a measure of the total quantity of flow of material at said point covering successive periods of time, time factor control means coupled with said first means for automatically and continuously providing a resultant output which is proportional to the measurement of said first means during any of said successive periods of time and inversely proportional to the time at any instant which has elapsed since the first means was last returned to said zero or reference condition, whereby continuous average flow data is available covering said respective successive time periods.

6. The apparatus of claim 5 wherein the accuracy of said first means is influenced by the static pressure in the conduit, and automatic means responsive to the static pressure in said conduit for introducing a correction factor into said output to compensate for errors introduced by the variations in static pressure in said conduit.

7. The flow rate indicating apparatus of claim 5 wherein there is provided recording means responsive to said resultant output, said recording means including means for automatically operating said recording means to record said resultant output at the end of each of said periods, and said recording means including manually responsive means for operating the recording means to record said resultant output at a number of instants within said successive time periods.

8. Apparatus for monitoring the flow of material in a given flow system comprising: a flow-measuring device, a source of reference potential, a flow potentiometer having its input coupled across said potential source, means responsive to said flow-measuring device for moving the movable contact of said potentiometer at a rate proportional to the instantaneous rate of flow of fluid in said conduit, means for automatically repeatedly resetting said movable potentiometer contact to a zero or reference position so that it provides a measure of the quantity of fluid flow covering successive time periods, means electrically connected to said flow potentiometer for substantially continuously providing a resultant output which is proportional to the quantity of material flow during said successive time periods and which is inversely proportional substantially at any instant to the time which has elapsed since the movable potentiometer contact was last returned to its zero or reference position, so that a resultant output is provided which is a measure of average flow for various time intervals within said successive periods, indicating means responsive to said resultant output, and means for initiating operation of said indicating means at any one of a number of different times between said successive resetting times.

9. In flow indicating apparatus: flow measuring means for providing a measure of the total quantity of material flowing in a given system respectively over a number of successive time periods including time controlled means for repeatedly resetting the measuring means to a zero or reference condition at the end of said time periods, time measuring means providing a measure of the time intervals between the beginning of each of said time periods and a number of instants therein prior to the next resetting time, and means responsive to said time and flow measuring means for providing a resultant output which is proportional to the total quantity of flow during said respective intervals of time and inversely proportional to said respective intervals, whereby a measurement proportional to the average rate of flow occurring during a number of different intervals within said periods is available.

10. Flow indicating apparatus comprising flow measuring means for measuring the total quantity of material flowing in a given system respectively over a number of successive time periods including time controlled means for repeatedly resetting the measuring means to a zero or reference condition at the end of said time periods, time measuring means for providing a measure of the time intervals between the beginning of each of said time periods and a number of instants therein prior and up to the next resetting time, means responsive to said time and flow measuring means for providing a resultant output which is proportional to the total quantity of flow during said respective intervals of time and inversely proportional to the duration of said respective intervals, whereby a measurement proportional to the average rate of flow occurring during a number of different intervals within and over said periods is available, recording means responsive to said resultant output, said recording means including means for automatically operating said recording means to record said resultant output at the end of each of said periods, and said recording means including manually responsive means for operating the recording means to record said resultant output at said instants within said successive time periods.

11. In apparatus for monitoring the flow of material in a system: a number of flow measuring devices for measuring the total quantity of material flowing in different points in said system, a source of reference potential, a number of flow potentiometers associated respectively with said flow measuring devices and having their inputs coupled across said potential source, respective means responsive to said respective flow measuring devices for moving the movable contacts of said respective flow potentiometers at a rate proportional to the instantaneous rate of flow of material at said different points in said system, means for repeatedly resetting the movable contacts of said flow potentiometers to a zero or reference position substantially simultaneously whereby the outputs of said flow potentiometers are a measure of the flow of material at said respective points in said system for successive periods of time, time factor control means including a variable resistance unit to be used in common with said potentiometers and a time responsive means for varying said resistance unit, the latter being arranged to continuously introduce a time factor into an output derived from a flow potentiometer to which it is to be electrically connected, said time factor being inversely proportional to the time interval between the last resetting of the movable potentiometer contacts to their zero or reference positions and any instant prior to the next resetting time whereby a resultant output proportional to average flow is obtained, means for resetting said variable resistance unit to a reference position in synchronism with the resetting of the movable contacts of said potentiometers so that the time factor is correlated with the flow measurement, and switch means for sequentially operatively connecting said variable resistance unit with said respective potentiometers.

12. The apparatus of claim 11 wherein there is provided a self-balancing circuit including signal input terminal means coupled to said switch means which feeds the output of the flow potentiometers sequentially thereto, a source of variable reference voltage and balancing motor means for automatically varying said source of reference voltage until the reference voltage substantially equals the input voltage fed from the flow potentiometer connected to said input terminal means at any instant, said variable resistance unit forming part of said source of variable reference voltage and the variation thereof varying the reference voltage in accordance with said time factor, and said recording means operated by said balancing motor means.

13. Apparatus for monitoring the flow of material in a system comprising: a number of flow measuring means providing a measure of the total quantity of material flowing at different points in a system, means for repeatedly resetting said flow measuring means to a zero or reference condition substantially simultaneously whereby the outputs of said measuring means are respectively a measure of the flow of material at said respective points for successive periods of time, time factor control means operatively coupled with said flow measuring means for substantially continuously introducing a time factor in respective outputs derived from said respective flow measuring means to provide resultant outputs which are proportional to the quantity of flow measured by said flow measuring means and are inversely proportional to the time intervals between the last resetting of the associated measuring means and any instant prior to the next resetting time, said time factor control means including time measuring means and means for resetting said time measuring means in synchronism with the resetting of said flow measuring means so that the time factor is correlated with the flow measurement, recording means for recording said resultant outputs, and manually operable means for initiating the recording of said resultant outputs at any one of a number of times between successive resetting times.

References Cited in the file of this patent

UNITED STATES PATENTS

| | | |
|---|---|---|
| 1,768,553 | Freeman | July 1, 1930 |
| 1,867,870 | Baker et al. | July 19, 1932 |
| 1,911,777 | Taylor | May 30, 1933 |
| 2,103,077 | Herron | Dec. 21, 1937 |
| 2,385,772 | Borden | Oct. 2, 1945 |
| 2,552,454 | Pitcher et al. | May 8, 1951 |
| 2,677,276 | Schmidt | May 4, 1954 |

FOREIGN PATENTS

| | | |
|---|---|---|
| 672,893 | Great Britain | May 28, 1952 |